United States Patent
Koshiishi et al.

(10) Patent No.: US 9,698,613 B2
(45) Date of Patent: Jul. 4, 2017

(54) CHARGING SYSTEM AND CHARGING STAND

(71) Applicant: NINTENDO CO., LTD., Kyoto (JP)

(72) Inventors: Kazunori Koshiishi, Kyoto (JP); Yuko Zenri, Kyoto (JP); Hideto Matoba, Kyoto (JP); Shinji Hirose, Kyoto (JP); Akihiro Yoshikawa, Kyoto (JP); Kumpei Fujita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 66 days.

(21) Appl. No.: 14/641,758

(22) Filed: Mar. 9, 2015

(65) Prior Publication Data

US 2015/0333549 A1 Nov. 19, 2015

(30) Foreign Application Priority Data

May 19, 2014 (JP) .................................. 2014-103568

(51) Int. Cl.
*H02J 7/00* (2006.01)
(52) U.S. Cl.
CPC .......... *H02J 7/0044* (2013.01); *H02J 7/0047* (2013.01)
(58) Field of Classification Search
CPC ....... H02J 7/0042; H02J 7/0044; H02J 7/0045
USPC .......................................................... 320/115
See application file for complete search history.

(56) References Cited

U.S. PATENT DOCUMENTS

| | | | |
|---|---|---|---|
| 2002/0043960 A1* | 4/2002 | Janik | G06F 1/1632 320/128 |
| 2009/0284216 A1* | 11/2009 | Bessa | H02J 7/0044 320/101 |
| 2014/0232341 A1 | 8/2014 | Ikegami | |
| 2014/0285150 A1* | 9/2014 | Toh | H04M 1/04 320/115 |

FOREIGN PATENT DOCUMENTS

| | | |
|---|---|---|
| JP | 63-132637 | 8/1988 |
| JP | 2001-093585 | 4/2001 |
| JP | 2002-135985 A | 5/2002 |

(Continued)

OTHER PUBLICATIONS

"Softbank 843SH Kantan Guide Book", Softbank Mobile Corp., 2nd edition, Oct. 2010, (3 pages) with English translation p. 208.

(Continued)

*Primary Examiner* — Arun Williams
(74) *Attorney, Agent, or Firm* — Nixon & Vanderhye P.C.

(57) ABSTRACT

A non-limiting example charging stand comprises a main body that includes an outer side member and the inner side member. The inner side member has an inserting portion for inserting a portable game apparatus. The inserting portion is set with a depth that hides a portion of a hinge but does not hide a cover constituting a part of a housing of the portable game apparatus when inserting the folded portable game apparatus in a vertical orientation. Accordingly, when viewing the portable game apparatus inserted in the charging stand from the front, it is possible to see a color, a pattern or an image of character that is applied to the cover. At this time, a color, a pattern or an image of character that is applied to an outer circumference surface (front) of the charging stand can be also seen.

19 Claims, 6 Drawing Sheets

(56) References Cited

FOREIGN PATENT DOCUMENTS

| | | |
|---|---|---|
| JP | 2003-150275 | 5/2003 |
| JP | 2006-174620 A | 6/2006 |
| JP | 2007-037324 | 2/2007 |
| JP | 2007-060823 | 3/2007 |
| JP | 2007-116317 | 5/2007 |
| JP | 2008-283752 | 11/2008 |
| JP | 2009-200799 | 9/2009 |
| JP | 2010-109543 | 5/2010 |
| JP | 2012-115030 A | 6/2012 |
| JP | 2012-161176 A | 8/2012 |
| JP | 2013-094036 | 5/2013 |

OTHER PUBLICATIONS

Crystal Shield 3DLL, [online] Apr. 23, 2013, Gametech Co., Ltd, retrieved from internet on Aug. 5, 2016 URL:https://web.archive.org/web/20130423041150/http://www.gametech.co.jp/products/catalog/1548/1548_1.html (3 pages).

* cited by examiner

FIG. 2(A) FRONT VIEW
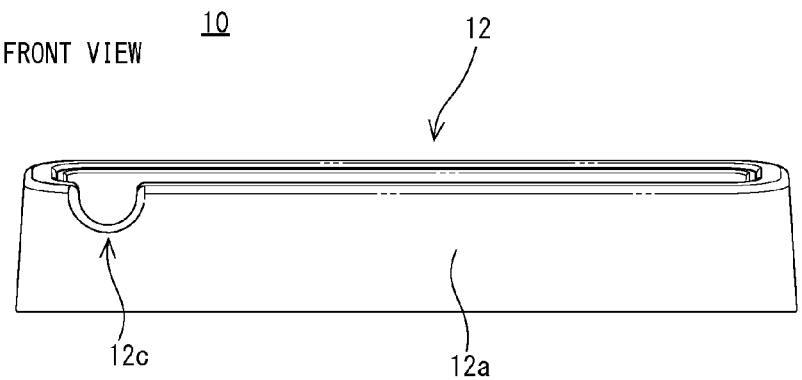
FIG. 2(B) REAR VIEW
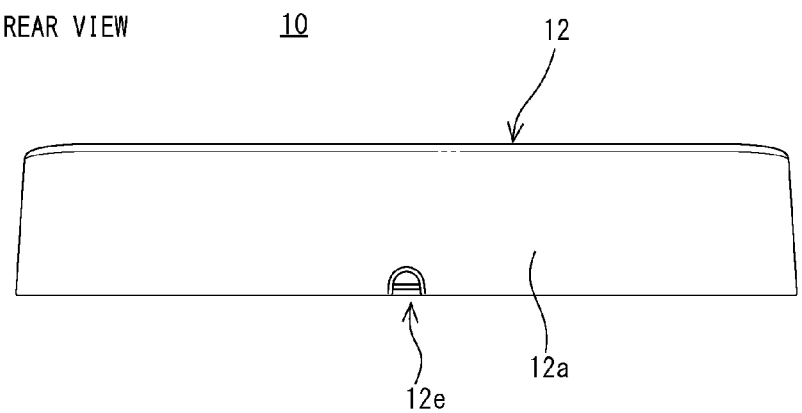
FIG. 2(C) LEFT SIDE VIEW
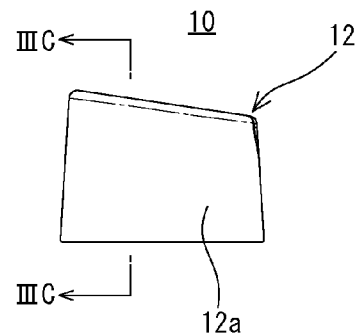
FIG. 2(D) RIGHT SIDE VIEW
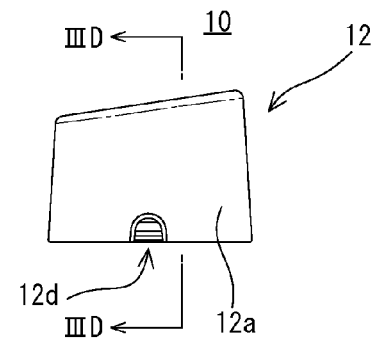

FIG. 3(A) TOP PLAN VIEW
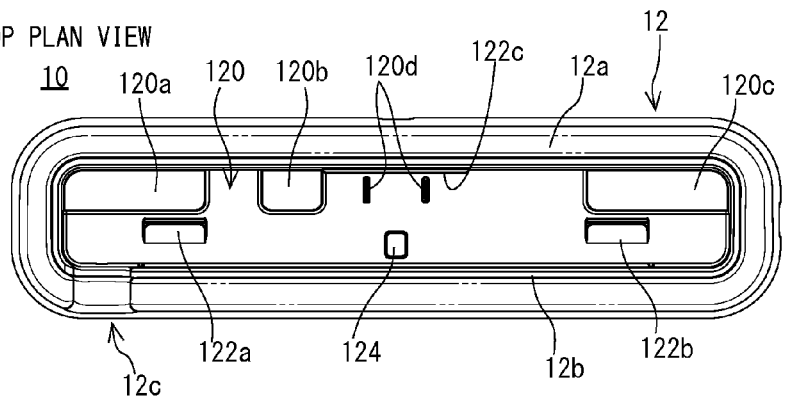
FIG. 3(B) BOTTOM PLAN VIEW
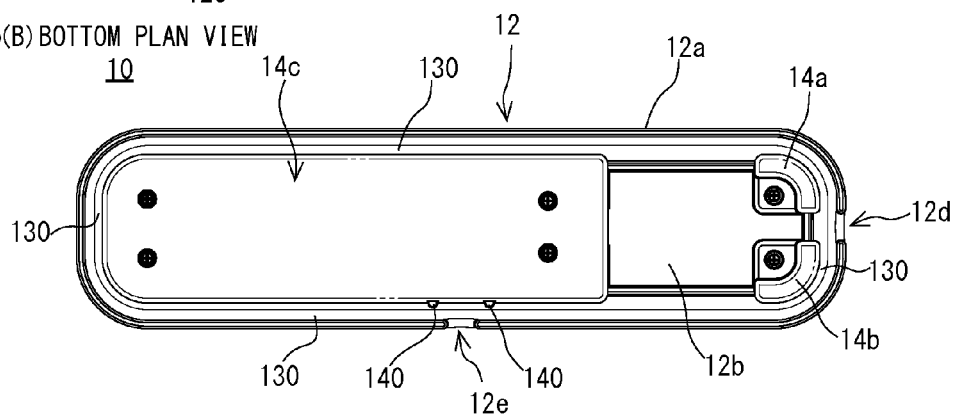
FIG. 3(C) CROSS-SECTIONAL VIEW AT IIIC-IIIC
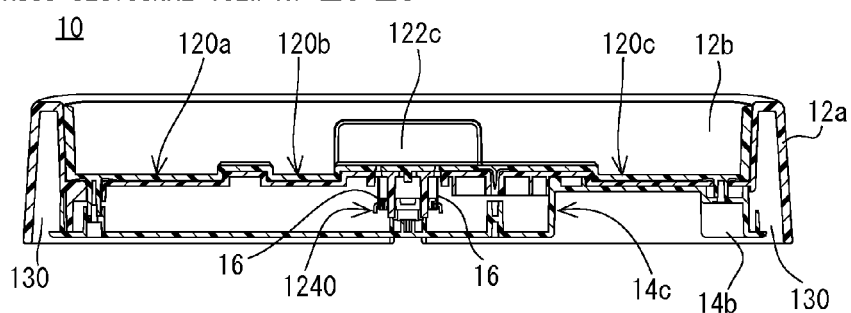
FIG. 3(D) CROSS-SECTIONAL VIEW AT IIID-IIID
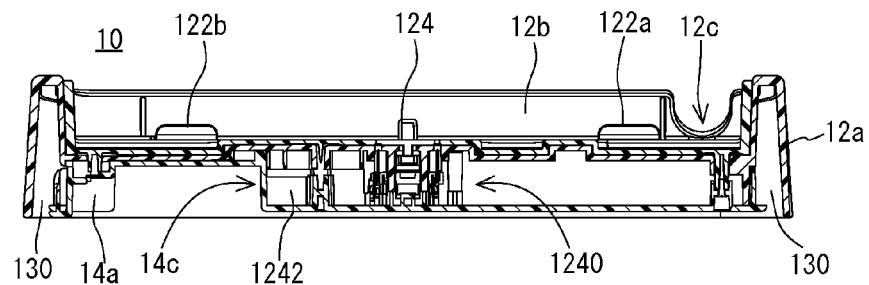

FIG. 6 (A)
FIG. 6 (B)
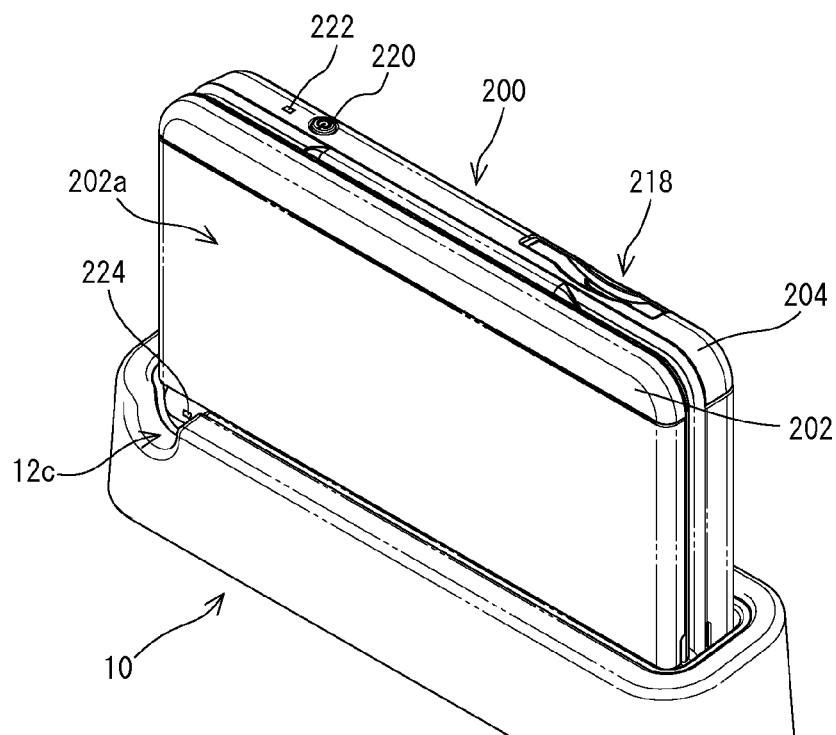
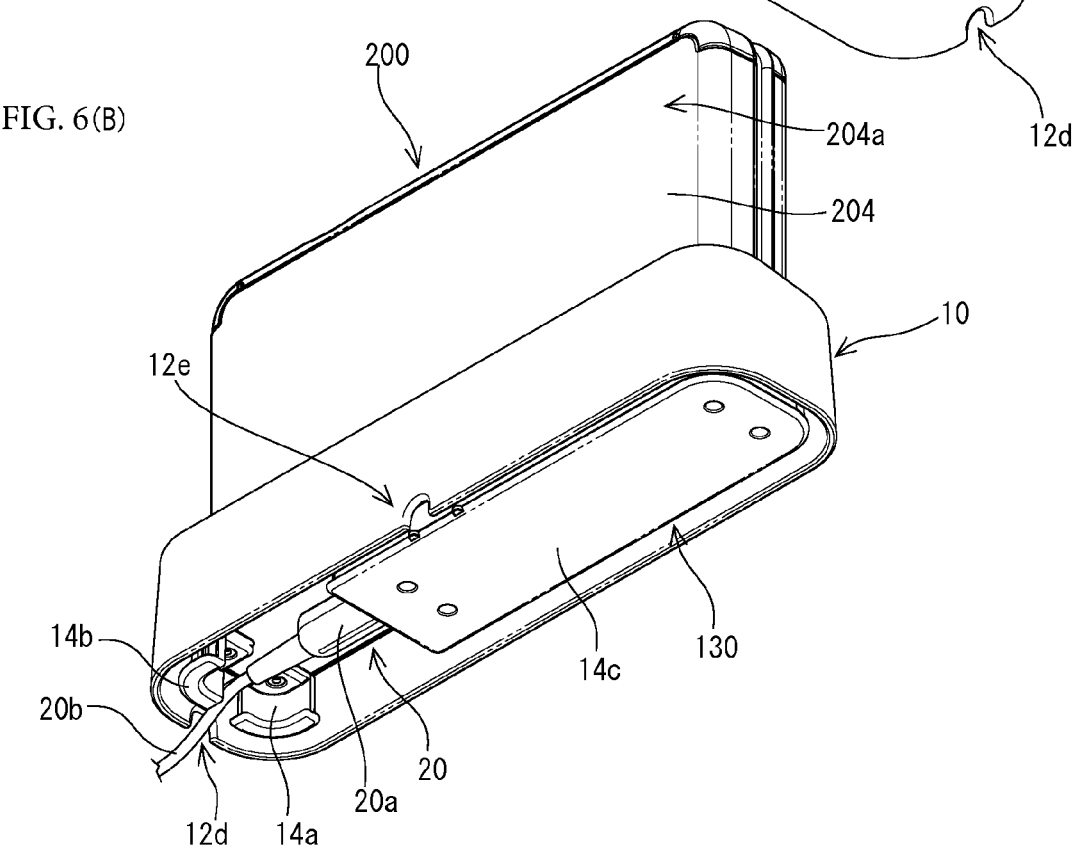

CHARGING SYSTEM AND CHARGING STAND

CROSS REFERENCE OF RELATED APPLICATION

The disclosure of the patent application No. 2014-103568 filed on May 19, 2014 is incorporated by reference.

FIELD

This application describes a charging system and charging stand charging a battery of electronic device.

SUMMARY

It is a primary object of an embodiment to provide a novel charging system and charging stand.

It is another object of the embodiment to provide a charging system and charging stand, capable of enjoying a design.

A first embodiment is a charging system comprising a foldable electronic device and a charging stand that receives and charges the electronic device, wherein the electronic device has a cover that is detachable and covers at least a part of the electronic device except a portion having a folding rotation axis. The charging stand has an inserting portion for inserting the portion having the holding rotation axis. A depth of the inserting portion is set such that when inserting the electronic device into the inserting portion, at least a part of a portion that is not covered with the cover is hidden by the charging stand, and a whole of a specific surface of the cover can be seen from a specific direction.

According to the first embodiment, since the depth of the inserting portion of the charging stand is set such that a whole of the specific surface of the cover can be seen, it is possible to enjoy a design of the cover even when inserting the electronic device into the charging stand.

A second embodiment is according to the first embodiment, wherein the charging stand hides most of the portion that is not covered with the cover when inserting the electronic device into the inserting portion.

According to the second embodiment, since the charging stand hides most of the portion that is not covered with the cover, most of a range that the electronic device can be seen is occupied by the specific surface of the cover when viewing the charging stand from the specific direction. Accordingly, it is possible to enjoy a design of the cover.

A third embodiment is according to the first embodiment, wherein the cover covers, at the specific surface thereof, the electronic device from one end to another end in a direction perpendicular or approximately perpendicular a direction that the electronic device is inserted into the inserting portion. Accordingly, when a user sees the charging stand from the specific direction, the specific surface can be seen in the front.

According to the third embodiment, when viewing the charging stand from the specific direction, it is possible to enjoy a design of the cover.

A fourth embodiment is according to the first embodiment, wherein the cover covers so as to surround the electronic device in a direction perpendicular or approximately perpendicular a direction that the electronic device is inserted into the inserting portion.

According to the fourth embodiment, even if the cover is seen from a direction other than the specific direction, it is possible to enjoy a design of the cover.

A fifth embodiment is according to first embodiment, wherein the depth of the inserting portion is set with a depth such that the charging stand does not hide the cover at a side of the specific direction when inserting the electronic device into the inserting portion.

According to the fifth embodiment, it is possible to see a whole of the cover when viewing from the specific direction.

A sixth embodiment is according to the fifth embodiment, wherein the electronic device is inserted into the inserting portion in a standing state and held in that state.

According to the sixth embodiment, since the electronic device is inserted in the charging stand in its standing state and held in that state, it is possible to enjoy a design of the cover if viewing the electronic device inserted into the charging stand from the front.

A seventh embodiment is according to the first embodiment, wherein the depth of the inserting portion is set such that a lower end of the cover is substantially identical to an upper end of the charging stand when viewing from the specific direction if inserting electronic device into the inserting portion. Therefore, the cover is not hidden by the charging stand when viewing from the specific direction.

According to the seventh embodiment, since the cover is not hidden by the charging stand when viewing from the specific direction, it is possible to enjoy a design of the cover.

An eighth embodiment is according to the first embodiment, wherein the cover and the charging stand are respectively formed with shapes, or applied with patterns or colors such that a unified design can be constituted as a whole when inserting the electronic device into the inserting portion.

According to the eighth embodiment, it is possible to enjoy a unified design as a whole with the cover and the charging stand.

A ninth embodiment is according to the first embodiment, wherein the charging stand further comprising a notch at a position corresponding to a light-emitting portion of the electronic device on a part of a side of the inserting portion when inserting the electronic device into the inserting portion.

According to the ninth embodiment, since the notch is provided at the position corresponding to the light-emitting portion of the electronic device on a part of the side of the inserting portion, it is possible to see the light-emitting portion during charge.

A tenth embodiment is according to the first embodiment, wherein the charging stand further comprising a first concavity capable of receiving at least a strap attaching portion at a position corresponding to the strap attaching portion that a strap is attached to the electronic device on a bottom of the inserting portion.

According to the tenth embodiment, since the strap attaching portion is received by the first concavity, it is possible to prevent the electronic device inserted into the inserting portion of the charging stand from shaking or inclining.

An eleventh embodiment is according to the first embodiment, wherein the charging stand further comprising a second concavity capable of receiving at least an operating portion of a push button at a position corresponding to a position of the push button provided on the electronic device on a bottom of the inserting portion.

According to the eleventh embodiment, since the operating portion of the push button is received by the second concavity, it is possible to prevent the electronic device inserted into the inserting portion of the charging stand from shaking or inclining.

A twelfth embodiment is according to the first embodiment, wherein the charging stand further comprising a convexity on a side of the inserting portion to be projected toward an inside of the inserting portion from the side so as to form a space between the electronic device and the side when inserting the electronic device into the inserting portion.

According to the twelfth embodiment, since the space is formed between the electronic device and the side of the inserting portion, it is possible to withdraw a strap out of the charging stand through the space even if attaching the strap to the electronic device.

A thirteenth embodiment is according to the first embodiment, wherein the charging stand further comprising a first projection on a bottom of the inserting portion to be projected from the bottom to above in a vertical direction to be inserted into a first gap between the portion having a folding rotation axis of the electronic device and a first housing of the electronic device when inserting the electronic device into the inserting portion.

According to the thirteenth embodiment, since the first projection is inserted into the first gap between the portion having the folding rotation axis of the electronic device and the first housing of the electronic device, the electronic device stably stands within the inserting portion.

A fourteenth embodiment is according to the first embodiment, wherein a depth of the inserting portion is gradually changed in a short direction. The depth of the inserting portion is made deeper as does to the rear from the front of the charging stand.

According to the fourteenth embodiment, it is compatible to show the cover and to make the electronic device stand stably.

A fifteenth embodiment is according to the first embodiment, wherein the charging stand further comprising an accommodation portion that accommodates a power cable at a side of an undersurface of the inserting portion.

According to the fifteenth embodiment, since the power cable can be accommodated, it is possible to adjust a length of the power cable.

A sixteenth embodiment is according to the fifteenth embodiment, wherein the charging stand further comprising an outer side member that covers an outer side of the inserting portion; a connecting portion that is provided in a side of the undersurface of the inserting portion and connects the power cable; and a second housing that accommodates at least a part of the connecting portion. The accommodation portion includes a second gap between an inner circumference surface of the outer side member and an outer circumference surface of the second housing.

According to the sixteenth embodiment, it is possible to accommodate the power cable in the second gap between the inner circumference surface of the outer member and the outer circumference surface of the second housing by winding the power cable on the outer circumference of the second housing, for example, at a side of the undersurface of the inserting portion.

A seventeenth embodiment is according to the sixteenth embodiment, wherein a connection plug of the power cable that is to be inserted into the connecting portion is arranged in a space formed at the side of the undersurface of the inserting portion. Furthermore, a communicating portion that passes the power cable is further provided on the outer side member.

According to the seventeenth embodiment, the connection plug is inserted into the connecting portion at the side of the undersurface of the inserting portion, and the power cable can be withdrawn from the communicating portion.

An eighteenth embodiment is according to the seventeenth embodiment, wherein the charging stand further comprising a second projection near a position corresponding to the position that the communicating portion is provided on an outer circumference surface of the second housing.

According to the eighteenth embodiment, since the power cable is sandwiched by the second projection between the second housing and the outer side member in a portion that the communicating portion is provided, it is possible to prevent the power cable from falling out from the second gap.

A nineteenth embodiment is a charging stand for charging an electronic device. The charging stand has an inserting portion that is inserted with the electronic device. Furthermore, in the charging stand, a notch is formed at a position corresponding to a light-emitting portion of the electronic device on a part of a side of the inserting portion. Furthermore, a concavity capable of receiving at least an operating portion of a push button is provided at a position corresponding to a position of the push button provided on the electronic device on a bottom of the inserting portion.

According to the nineteenth embodiment, it is possible not only to see the light-emitting portion of the electronic device through the notch but to make the electronic device stand stably. Accordingly, it is possible to perform the charge stably.

The above described objects and other objects, features, aspects and advantages of the embodiments will become more apparent from the following detailed description when taken in conjunction with the accompanying drawings.

BRIEF DESCRIPTION OF THE DRAWINGS

FIGS. 2(A)-(D) show a non-limiting example appearance of the charging stand shown in FIG. 1, wherein FIG. 2(A) is a front view, FIG. 2(B) is a rear view, FIG. 2(C) is a left side view and FIG. 2(D) is a right side view.

FIGS. 3(A)-(D) show a non-limiting example appearance and cross section of the charging stand shown in FIG. 1, wherein FIG. 3(A) is a top plan view, FIG. 3(B) is a bottom plan view, FIG. 3(C) is a cross-sectional view at a line IIIC-IIIC of FIG. 2(C) and FIG. 3(D) is a cross-sectional view at a line IIID-IIID of FIG. 2(D).

FIGS. 4(A)-(B) show a non-limiting example appearance structure in a state where a portable game apparatus that is to be charged on the charging stand shown in FIG. 1 is opened, wherein FIG. 4(A) is a perspective view obliquely viewing down the front, and FIG. 4(B) is a perspective view obliquely viewing down the rear.

FIGS. 5(A)-(B) show a non-limiting example state where the portable game apparatus shown in FIG. 4 is folded, wherein FIG. 5(A) is a perspective view obliquely viewing the rear of a first housing, and FIG. 5(B) is a perspective view obliquely viewing the rear of a second housing.

FIGS. 6(A)-(B) show a non-limiting example state where a folded portable game apparatus shown in FIG. 5 is inserted into the charging stand shown in FIG. 1, wherein FIG. 6(A) is a perspective view obliquely viewing down the charging stand and FIG. 6(B) is a perspective view obliquely viewing up the charging stand.

DETAILED DESCRIPTION OF NON-LIMITING EXAMPLE EMBODIMENTS

Figure 1:
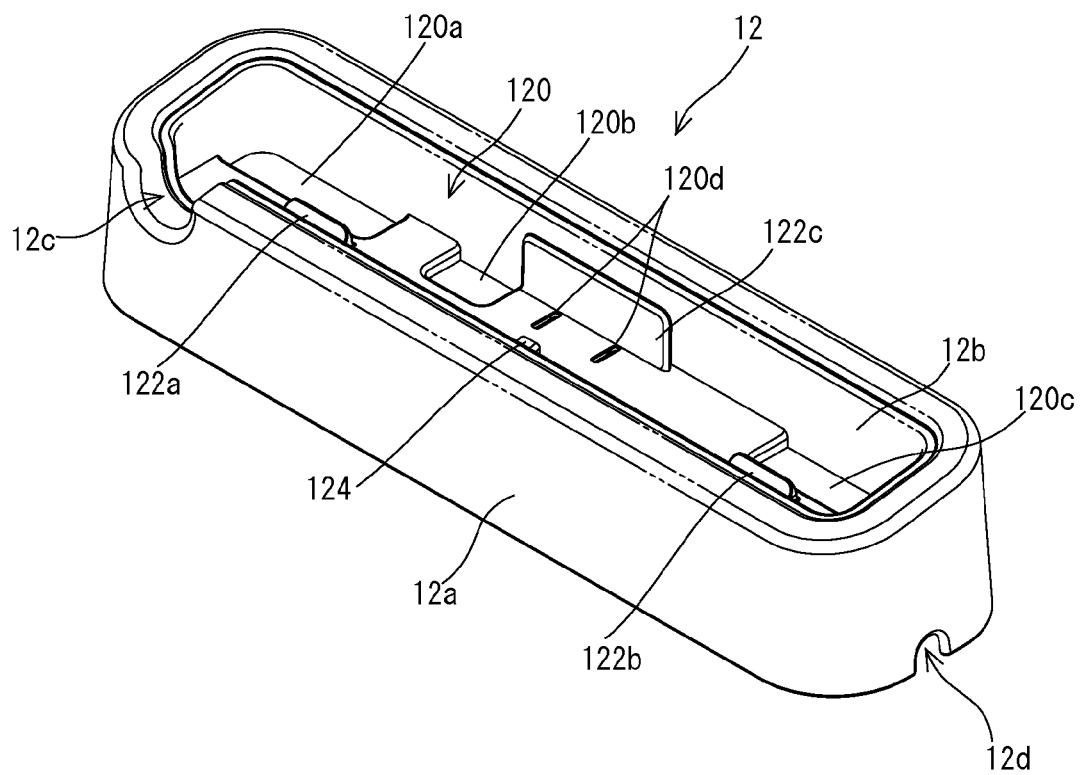
FIG. 1 is a perspective view obliquely viewing down a non-limiting example charging stand.

FIG. 1 is a perspective view obliquely viewing down a non-limiting example charging stand (cradle) 10. FIG. 2(A) is a front view viewing the charging stand 10 from the front, FIG. 2(B) is a rear view viewing the charging stand 10 from the rear, FIG. 2(C) is a left side view viewing the charging stand 10 from a left side and FIG. 2(D) is a right side view viewing the charging stand 10 from a right side. FIG. 3(A) is a top plan view viewing down the charging stand 10, FIG. 3(B) is a bottom plan view viewing up the charging stand 10, FIG. 3(C) is a cross-sectional view at a line IIIC-IIIC in FIG. 2(C) and FIG. 3(D) is a cross-sectional view at a line IIID-IIID in FIG. 2(D).

With reference to FIG. 1 to FIG. 3, the charging stand 10 includes a main body 12 that includes an outer side member 12a and an inner side member 12b. As well seen from FIG. 3(A), the main body 12 (charging stand 10) is formed in a track shape or a shape that corners of a rectangle are rounded when viewing from the top. The outer side member 12a defines a size and an external shape of the main body 12 (charging stand 10). Accordingly, a size and an external shape of the outer side member 12a are the same as the size and the external shape of the main body 12 (charging stand 10).

Furthermore, the inner side member 12b is provided inside the outer side member 12a, and as well seen from FIG. 3(A), formed in a track shape or a shape that corners of a rectangle are rounded when viewing from the top. In addition, the outer side member 12a is provided so as to cover an outer surface of the inner side member 12b. This inner side member 12b has a concavity (inserting portion) 120 for inserting a portable game apparatus 200 (see FIG. 4 and FIG. 5) describe later. Unevenness and holes are formed on the bottom of the inserting portion 120. Specifically, as shown in FIG. 3(A), FIG. 3(C) and FIG. 3(D), there are formed on the bottom of the inserting portion 120 with a concavity 120a, a concavity 120b and a concavity 120c each sinking down in the vertical direction of the charging stand 10. Furthermore, two holes 120d are formed in the center of the bottom of the inserting portion 120 on a side of the rear of the inserting portion 120. Furthermore, as seen also from FIG. 3(A) and FIG. 3(D), there are formed with a convexity (projection) 122a and a projection 122b each projecting upward in the vertical direction of the charging stand 10 from the center nearer the inner sides of right and left on the bottom of the inserting portion 120. In addition, each of the projection 122a and the projection 122b is formed in a plate shape that is extended in a longitudinal direction of the charging stand 10 (inserting portion 120). A convexity 122c that projects toward an inside of the inserting portion 120 is formed on the rear of the inserting portion 120. Furthermore, a lever 124 that penetrates upward through the bottom of the inserting portion 120 from a lower part of the inserting portion 120 is provided on the inserting portion 120.

As seen from FIG. 1, FIG. 2(A) and FIG. 3(A), a notch 12c of a semi-circle shape is formed in upper left of the main body 12 (the outer side member 12a and the inner side member 12b) in the front of the charging stand 10. Furthermore, as seen from FIG. 1, FIG. 2 (D) and FIG. 3 (B), a notch (communicating portion) 12d of a semi-circle shape is formed in the center of a lower end portion of the outer side member 12a on the right side of the charging stand 10. Furthermore, as seen from FIG. 2(B) and FIG. 3(B), a notch 12e (communicating portion) of a semi-circle shape is formed in the center of a lower end portion of the outer side member 12a on the rear of the charging stand 10. Furthermore, as seen also from FIG. 2 (C) and FIG. 2(D), in the charging stand 10 of this embodiment, a height of the main body 12 is made higher as goes to the rear from the front. That is, a depth of the inserting portion 120 is made deeper as goes to the rear from the front.

As shown in FIG. 3(B) to FIG. 3(D), a guide member 14a, a guide member 14b and a housing 14c are screwed to an undersurface of the inner side member 12b. Each of the guide member 14a and the guide member 14b is a fan shape in planar shape, and fixed to the undersurface of the inner side member 12b at a position that an arc portion thereof overlaps with a round corner portion of the outer side member 12a while separated from an inner surface of the outer side member 12a with a predetermined distance. It should be noted that the predetermined distance is a length capable of receiving a power cable 20b of an AC adaptor 20 (see FIG. 6(B)) describe later. That is, the predetermined distance is set to approximately the same as a length of a diameter of a power cable 20b. Hereinafter, the same is true.

Furthermore, a planar shape of the housing 14c is approximately a rectangular shape and four corners thereof are made as round corners. As seen also from FIG. 3(B), the housing 14c is fixed to the undersurface of the inner side member 12b with an outer circumference thereof but except a right side while separated from the inner circumference surface of the outer side member 12a with a predetermined distance. The housing 14c is shortened than the inner side member 12b in its length of the longitudinal direction. Therefore, a space is formed between the guide member 14a and the guide member 14b, and the housing 14c. This space is formed in order to insert a DC output plug 20a of the AC adaptor 20 (see FIG. 6 (B)).

By providing the guide member 14a, the guide member 14b and the housing 14c, an approximately track-shaped (a shape of an ellipse) accommodation portion 130 that has a width of predetermined distance between these and the outer side member 12a is formed. A length of the power cable 20b can be adjusted by winding the power cable 20b of the AC adaptor 20 around this accommodation portion 130. That is, it is possible to freely adjust the length of the power cable 20b from an insertion plug that is inserted in an electric socket to the charging stand 10. Furthermore, as described later, it is also possible to withdraw the power cable 20b from the notch 12e. Therefore, the degree of freedom of a place and a direction arranging the charging stand 10 is high.

Furthermore, two projections 140 are provided near a position that the notch 12e of the outer side member 12a is provided on an outer circumference surface of the housing 14c so as to sandwich the notch 12e. Therefore, a distance between the inner circumference surface of the outer side member 12a and the outer circumference surface of the housing 14c is made shorter than a predetermined distance at a position that the projections 140 are provided. By providing such the projections 140, the power cable 20b is held by the projections 140 and the inner circumference surface of the outer side member 12a. Therefore, the power cable 20b is prevented from breaking away from the accommodation portion 130 when withdrawing the power cable 20b from the notch 12e. Accordingly, the charging stand 10 can be prevented from rising.

Although a detailed description is omitted because it is not the essential content for this case, as shown in FIG. 3 (B)-FIG. 3 (D), the housing 14c has an insertion port for inserting the DC output plug 20a of the above-described AC adaptor 20, and covers a mechanism 1240 for moving a lever 124 up and down in the vertical direction and for moving the charge terminals 16 up and down in the vertical direction in conjunction with the lever 124. Furthermore, there is provided inside the housing 14c with a power source wire that connects the charge terminals 16 and a connection terminal 1242 that inserts the DC output plug 20a.

In addition, as described later, when inserting the portable game apparatus 200 into the inserting portion 120, the lever 124 is pushed down in the vertical direction by a part of a hinge (portion having a folding rotation axis) 206 of the portable game apparatus 200, and accordingly, the charge terminals 16 are lifted up in the vertical direction via a hole 120d.

As mentioned above, the charging stand 10 of this embodiment is used in order to charge a battery of the portable game apparatus 200 that is an example of the electronic device. FIG. 4 (A) is a perspective view obliquely viewing down a side of the front of a state where the portable game apparatus 200 is opened and FIG. 4 (B) is a perspective view obliquely viewing down a side of the rear of the state where the portable game apparatus 200 is opened.

In addition, when describing the portable game apparatus 200 and components thereof using directions, a description will be made using the directions of up, down, left and right shown in FIG. 4 (A). Therefore, in FIG. 4 (B), since the portable game apparatus 200 is turned upside down while the up and down direction is maintained, the left and right direction becomes reversed with respect to a case shown in FIG. 4 (A). Furthermore, in the portable game apparatus 200, a surface that an upper LCD 210, a lower LCD 212, etc. describe later are provided will be called the front, and a surface (rear surface) opposite thereto will be called the rear. In addition, a width of the portable game apparatus 200 in a direction perpendicular to both of the up and down direction and the left and right direction of the portable game apparatus 200 may be called a thickness. This is also the same about an upper housing 202 and a lower housing 204.

As shown in FIG. 4 (A), the portable game apparatus 200 includes the upper housing 202 and the lower housing 204, and the upper housing 202 and the lower housing 204 are rotatably coupled to each other by a hinge 206 (portion having a folding rotation axis). Therefore, a main body of the portable game apparatus 200 is constituted by the upper housing 202, the lower housing 204 and the hinge 206.

As shown in FIG. 4 (A), the upper LCD 210 is provided at approximately the center on a side of the front of the upper housing 202. The upper housing 202 is provided with holes 202h for each outputting a sound from a speaker provided inside the upper housing 202 in right and left of the upper LCD 210.

As shown in FIG. 4 (A), the lower LCD 212 is provided in approximately the center of a side of the front of the lower housing 204. A cross key 214 is provided in left of the lower LCD 212 on the lower housing 204, and four push buttons (A button, B button, X button, Y button) 216 are provided in right of the lower LCD 212.

Furthermore, as shown in FIG. 4 (A), a card slot 218, a power button 220 and a power lamp 222 are provided on an undersurface of the lower housing 204.

The card slot 218 is provided in order to insert a game card (not shown) that is storage medium storing in advance a game program, other application programs, etc.

The power lamp 222 is an LED lamp, for example, and turned on/off according to ON/OFF of the power supply, and indicates a residual quantity of the battery by a color and blinking of a light (light emitting) when turning on the power supply. If turning on the power supply, for example, when the residual quantity of the battery exceeds a first predetermined quantity (for example, half), the power lamp 222 emits a light with a blue color, and when less than the first predetermined quantity, emits with a red color. Then, when the residual quantity of the battery becomes very small, that is, when the residual quantity becomes less than a second predetermined quantity that is smaller than the first predetermined quantity, the power lamp 222 is blinked with a red color. Furthermore, at a time of charge, the power lamp 222 indicates whether be under charge by a color and blinking of a light (light emitting). For example, the power lamp 222 is turned off when terminating the charge after turned on with a red color during the charge. Thus, the power lamp 222 functions as an indicator for the power supply.

Then, as shown in FIG. 4 (A), a communication lamp 224 that functions as an indicator for indicating a communication situation is provided in an end portion in right of the hinge 206. The communication lamp 224 is an LED lamp, for example, and emits a light with a green color during a communication with another game apparatus by a short-distance wireless communication or after the communication, and emits a light with a blue color during a communication with another game apparatus or computer on the Internet by connecting with a wireless LAN or after the communication.

Furthermore, as shown in FIG. 4 (B), a part of a side of the rear of the upper housing 202 is attached with a cover 202a that is attachable and detachable, and a part of a side of the rear of the lower housing 204 is attached with a cover 204a that is attachable and detachable. That is, the cover 202a and the cover 204a cover surfaces of a thickness direction of the portable game apparatus 200. Although not shown, the cover 202a is mechanically attached to an attachment portion for the cover 202a of the upper housing 202. However, the cover 202a may be adhered by a double-stick tape or the like, or may be screwed by providing screw holes. In this embodiment, as shown in FIG. 4 (B), the cover 204a is screwed to an attachment portion for the cover 204a of the lower housing 204.

As shown in FIG. 4 (B), a push button (L button) 226 and a push button (R button) 228 are provided at left and right ends on an upper surface of the lower housing 204. A further push button (ZL button) 230 is provided near the push button 226 on the upper surface of the lower housing 204. Furthermore, a further push button (ZR button) 232 is provided near the push button 228 on the upper surface of the lower housing 204.

Figure 4A:
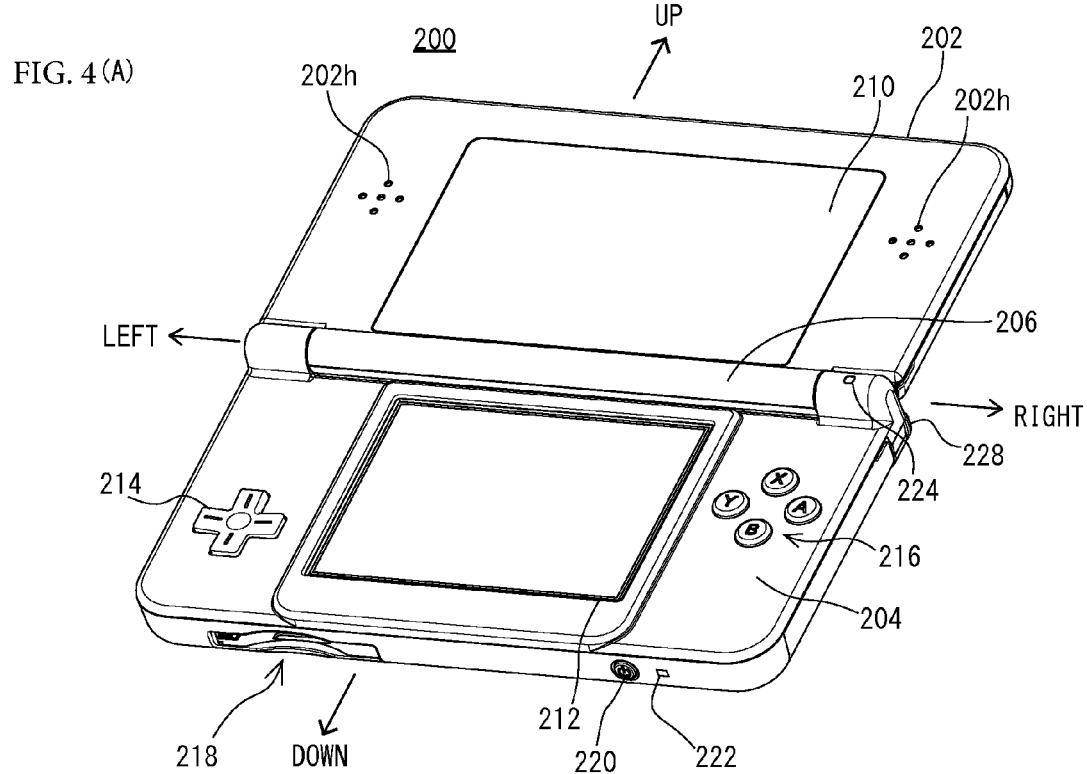
Figure 4B:
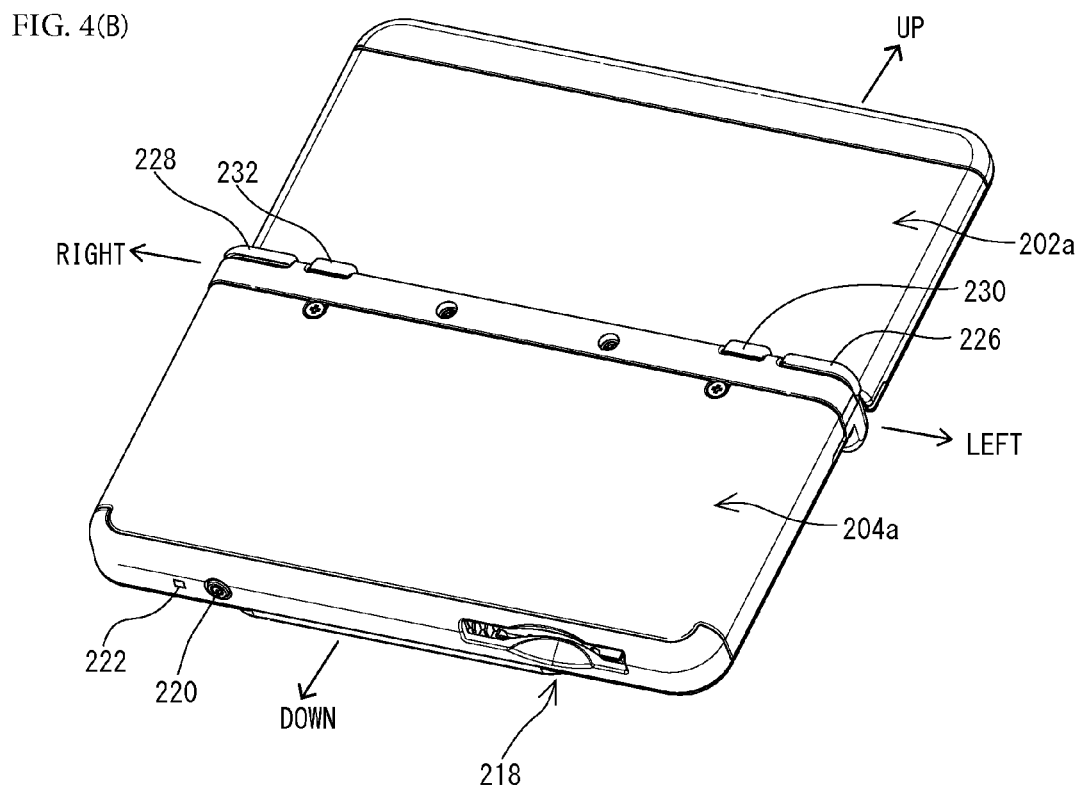

In addition, the structure of the portable game apparatus 200 shown in FIG. 4(A) and FIG. 4(B) is an example, and should not be limited to this. A touch panel may be provided instead the lower LCD 212 or on the lower LCD 212, for example.

For example, the cover 202a and the cover 204a may be applied with the same color or predetermined colors, or applied (drawn) with a predetermined pattern or a predetermined character (an animation character or a game character). However, the color or the pattern applied to the cover 202a and the cover 204a may be the same or may differ from each other. A single big picture may be represented on the cover 202a and the cover 204a by combining objects respectively drawn on them. In addition, different kinds of character may be drawn on the cover 202a and the cover 204a, or a single big character may be represented on the cover 202a and the cover 204a by combining objects respectively drawn on them.

Furthermore, in a usual portable game apparatus 200, the main body, that is, the upper housing 202, the lower housing 204 and the hinge 206 are applied with predetermined colors. Therefore, it is possible to change a color or pattern of a part of the upper housing 202 and the lower housing 204, or to apply a desired character to at least one of the upper housing 202 and the lower housing 204 by exchanging the cover 202a and the cover 204a for other kinds of cover(s), for example. That is, it is possible to perform the change of clothes in a part of the upper housing 202 and the lower housing 204. However, the cover 202a and the cover 204a can be exchanged for the same kind of covers.

Figure 5A:
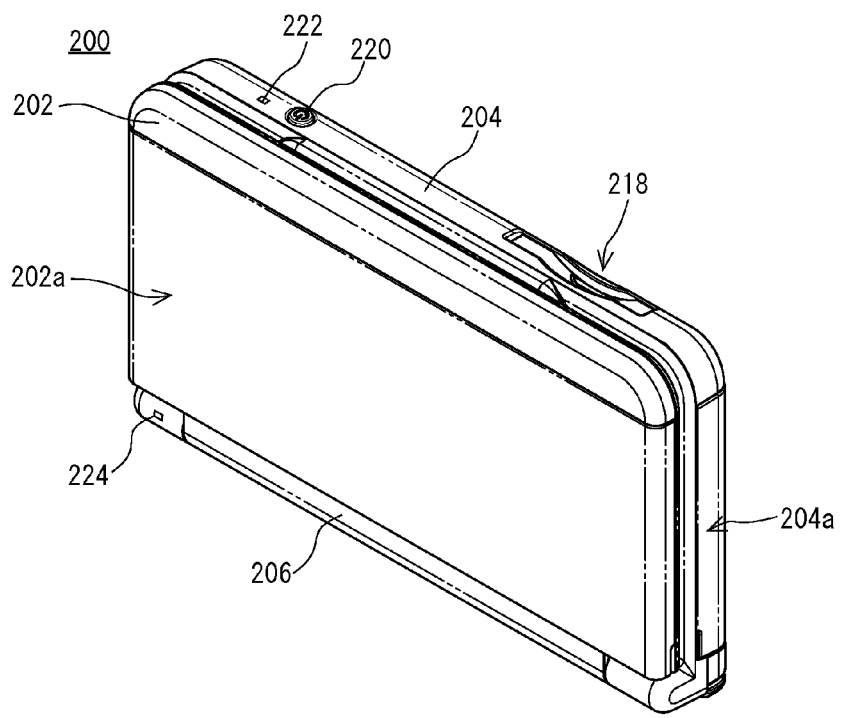
Figure 5B:
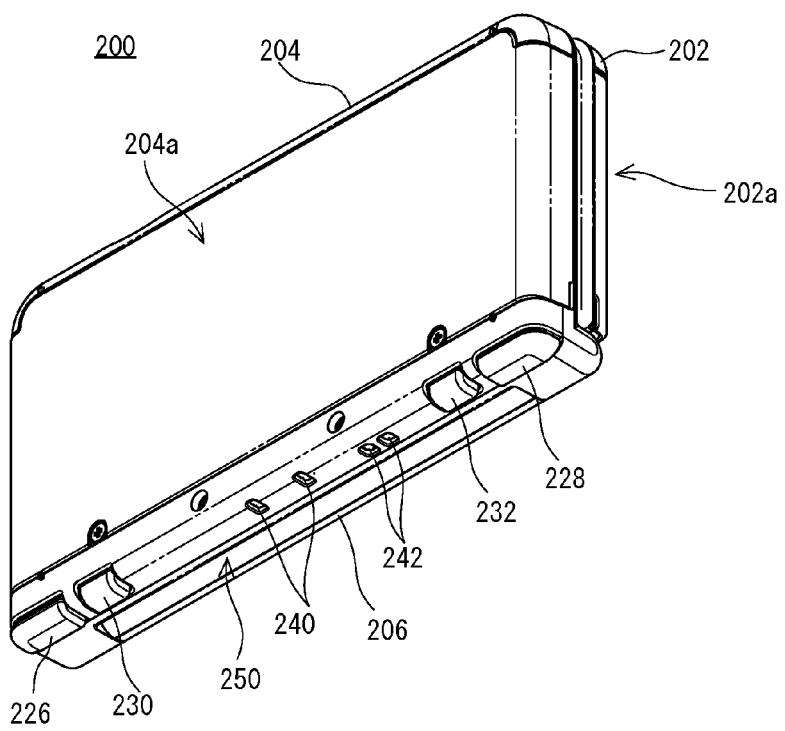

FIG. 5 (A) is a perspective view obliquely viewing one side of the rear of a state where the portable game apparatus 200 is closed and FIG. 5 (B) is a perspective view obliquely viewing another side of the rear of the state where the portable game apparatus 200 is closed.

When charging the portable game apparatus 200 using the charging stand 10, as shown in FIG. 5 (A) and FIG. 5 (B), the portable game apparatus 200 is first folded. That is, the upper housing 202 and the lower housing 204 are rotated so as to make the upper part LCD 210 and the lower LCD 212 face each other. Here, as shown in FIG. 5 (A), when viewing the folded portable game apparatus 200 from a side of the rear of the upper housing 202, a portion that is not covered with the cover 202a out of the upper housing 202 and a flat surface of the cover 202a can be seen. The hinge 206 that rotatably couples the upper housing 202 and the lower housing 204 can be seen.

As shown in FIG. 5 (B), when viewing the folded portable game apparatus 200 from a side of the rear of the lower housing 204, it is possible to see the operating portions of the push buttons 226-232 that are provided on the upper surface of the lower housing 204 as mentioned above. Two power supply terminals 240 are provided in the center of the upper surface of the lower housing 204. Furthermore, a hole 242 for attaching a strap (attaching hole) is provided between the push button 232 and the power supply terminals 240 on the upper surface of the lower housing 204. In addition, since the upper housing 202 and the lower housing 204 are rotatably coupled to each other by the hinge 206, a gap 250 is formed between an upper end portion of the lower housing 204 and the hinge 206.

Next, the folded portable game apparatus 200 is laid on the charging stand 10. That is, the folded portable game apparatus 200 is inserted into the inserting portion 120. Since the power supply terminals 240 of the portable game apparatus 200 are provided on the upper surface of the lower housing 204 as mentioned above, the upper part of the lower housing 204 and the portion of the hinge 206 are inserted into the inserting portion 120 such that the power supply terminals 240 can be brought into contact with the charge terminals 16 of the charging stand 10. At this time, the operating portions of the push button 228 and the push button 232 are received in the concavity 120a, and in a similar manner, the operating portions of the push button 226 and the push button 230 are received in the concavity 120c. If attaching a strap to the attaching hole 242 of the portable game apparatus 200, an attaching portion (knot of the strap) is received in the concavity 120b. Furthermore, the projection 122a and the projection 122b are inserted into the gap 250. That is, the portable game apparatus 200 is placed vertically.

Therefore, a flat portion of the upper surface of the lower housing 204 comes into contact with a flat portion without the unevenness (120a-120c, 124) and the hole 120d of the bottom of the inserting portion 120. At this time, the upper surface of the hinge 206 that becomes flush with the flat portion of the upper surface of the lower housing 204 also comes into contact with the flat portion of the bottom of the inserting portion 120. Furthermore, since the depth of the inserting portion 120 is made deeper as goes to the rear, at a side of the lower housing 204 of the portable game apparatus 200, an amount inserted into the inserting portion 120 becomes larger than that at a side of the upper housing 202 (hinge 106) of the portable game apparatus 200. Therefore, the portable game apparatus 200 stands relatively stably. Furthermore, in this embodiment, since the projection 122a and the projection 122b are inserted into the gap 250, the portable game apparatus 200 is prevented from inclining in the direction of a short direction (the direction of the front and the rear) of the charging stand 10. Therefore, the portable game apparatus 200 stands stably in comparison with a case where the projection 122a and the projection 122b are not provided, and is held in a vertical state.

As shown in FIG. 6 (A) and FIG. 6 (B), for example, the portable game apparatus 200 is inserted into the inserting portion 120 of the charging stand 10. In addition, FIG. 6 (A) is a perspective view obliquely viewing down the charging stand 10 that the portable game apparatus 200 is inserted. FIG. 6 (B) is a perspective view obliquely viewing up the undersurface of the charging stand 10 that the portable game apparatus 200 is inserted. It is possible to call a charging system a configuration that the portable game apparatus 200 is thus inserted into the charging stand 10.

As shown in FIG. 6 (A), the portable game apparatus 200 is arranged such that the flat surface of the cover 202a of the upper housing 202 can be seen in the front. As seen from FIG. 6 (A), in a side of the front of the charging stand 10, only the hinge 206 is hidden by the inserting portion 120, and this hinge 206 is not covered with the cover 202a. In other words, in a side of the front of the charging stand 10, a position (height) of the upper end of the charging stand 10 (outer side member 12a) is identical (or substantially identical) to a position (height) of the lower end of the cover 202a. The depth of the inserting portion 12 is set so as to become like this. Therefore, about the upper housing 202 (cover 202a), at least an entire surface (flat surface) in a side of the front can be seen. Therefore, it is possible to see a color, a pattern or an image of character applied to the cover 202a. That is, it is possible to enjoy a design of the cover 202a.

In addition, as mentioned above, the depth of the inserting portion 12 becomes deeper as goes to the rear.

However, in addition to the upper housing 202 of the portable game apparatus 200, but the lower housing 204 is also covered with the cover 204a, and the cover 202a and the cover 204a cover not only the rear of the housings (202, 204) but a part of the side thereof. That is, the housings (202, 204) are almost covered with the covers (202a, 204a) in a state where the portable game apparatus 200 is folded. Therefore, even if viewing the charging stand 10 from a direction other than the front, it is possible to see a whole or a part of the color, the pattern or the image of character applied to the cover 202a or/and the cover 204a.

Furthermore, it is possible to enjoy a unified design by applying a feeling of unification of appearance or a feeling of unification of concept about a color, a pattern or an image of character on the outer circumference surface of the outer side member 12a of the charging stand 10 and a color, a pattern or an image of character of the cover 202a. For example, a feeling of unification of appearance corresponds to a fact that when viewing a whole of the cover 202a and the charging stand 10, similar patterns or a single unitary character is applied to them. A feeling of unification of concept corresponds to a fact that when viewing a whole of the cover 202*a* and the charging stand 10, a picture that evokes a certain tale is applied (drawn) to them, etc.

Furthermore, in this embodiment, a feeling of unification may be applied to a shape of the charging stand 10 and a shape of the cover(s) 202*a* (and 204*a*). For example, jagged notches are formed on the upper surface (upper ends of the outer side member 12*a* and the inner side member 12*b*) of the charging stand 10, and jagged notches having the same shape may be formed on at least the lower end(s) of the cover(s) 202*a* (and 204*a*) such that both notches correspond to each other. Otherwise, when viewing from the front, jagged notches that fit jagged notches provided on the upper surface of the charging stand 10 may be formed on the lower end portion of the cover 202*a*. These are examples and should not be limited. A shape of the charging stand 10 and a shape of the cover 204*a* are determined such that a unified design may be constituted as a whole.

In addition, a design having a feeling of unification as a whole may be constituted by combining a shape of the charging stand 10 or a color, pattern or the like applied to the charging stand 10 with a shape of the cover 204*a* or a color, pattern or the like applied to the cover 204*a*.

Furthermore, the communication lamp 224 provided on the hinge 206 is arranged at a position that the notch 12*c* is provided. Therefore, even if the portable game apparatus 200 is being charged, it is possible to see the lighting, putting out light, blinking and the color of lighting (luminescence) of the communication lamp 224.

Furthermore, as shown in FIG. 6 (B), the DC output plug 20*a* of the AC adaptor 20 is connected to the internal connection terminal 1242 from the side of the housing 14. In the example shown in FIG. 6 (B), the power cable 20*b* is withdrawn from the notch 12*d*, and the insertion plug that is provided at an end opposite to the DC output plug 20*a* is inserted into an electric socket. In addition, as mentioned above, by accommodating the power cable 20*b* in the accommodation portion 130, it may be made to adjust a length thereof or to withdraw the power cable 20*b* from the notch 12*e*. For example, the power cable 20*b* is wound around the guide member 14*a*, the guide member 14*b* and the housing 14*c* to be accommodated in the accommodation portion 130.

In addition, a DC voltage that is generated by stepping-down and rectifying the commercial power supply at a side of the insertion plug is supplied to the charging stand 10 via the power cable 20*b* and the DC output plug 20*a*.

Furthermore, as shown in FIG. 6 (A) and FIG. 6 (B), when attaching the portable game apparatus 200 to the charging stand 10, since the above-mentioned convexity 122*c* is brought into contact with a part of the lower housing 204 of the portable game apparatus 200 (portion that is not covered with the cover 204*a*), a space is formed between the rear (flat surface of the cover 204*a*) of the lower housing 204 that is not brought into contact with the convexity 122*c* and the rear of the inserting portion 120. Therefore, a strap is withdrawn to an outside of the charging stand 10 through this space. Accordingly, the portable game apparatus 200 that is put on the charging stand 10 does not shake or incline by having attached with the strap. That is, a contact state of the charge terminals 16 and the power supply terminals 240 is stabilized.

Furthermore, as seen also from FIG. 1 and FIG. 3 (C), the convexity 122*c* does not reach the upper surfaces (top surface) or upper ends of the outside member 12*a* and the inner side member 12*b*. That is, a width of the convexity 122*c* in a height direction of the charging stand 10 is smaller (shorter) than a depth of the inserting portion 120, and the convexity 122*c* is formed to be adjacent to the bottom of the inserting portion 120. Therefore, as mentioned above, when attaching the portable game apparatus 200 to the charging stand 10, the convexity 122*c* comes into contact with a part of the lower housing 204 of the portable game apparatus 200, but not with the cover 204*a* (not overlapped). Accordingly, even if the portable game apparatus 200 is attached with the cover 204*a* that is napped, for example, the cover 204*a* does not come into contact with the side of the inserting portion 12 or hardly comes into contact.

According to this embodiment, since a whole of the flat surface of the cover and the front of the charging stand can be seen when inserting the portable game apparatus that is attached with an attachable/detachable cover that constitutes a part of the housing, it is possible to enjoy the design of the cover and the unified design of the cover and the charging stand.

According to this embodiment, since the concavities receiving the operating portions of the push buttons and the attaching portion of the strap that are provided on the upper surface of the lower housing of the portable game apparatus are provided on the bottom of the inserting portion, it is possible to make the portable game apparatus stand stably.

Furthermore, according to this embodiment, since the projection to be inserted into the gap between the lower housing of the folded portable game apparatus and the hinge is provided on the bottom of the inserting portion, the portable game apparatus may not shake or incline, and accordingly, the contact state of the charge terminals 16 and the power supply terminals 240 becomes stable. That is, the charge can be performed stably.

Furthermore, according to this embodiment, since the accommodation portion that accommodates the power cable of the AC adaptor is provided while providing two or more communicating portions for withdrawing the power cable, it is possible to adjust the length of the power cable or to change a direction that the power cable is withdrawn corresponding to the place to put the charging stand. Therefore, it is possible to make appearance beautiful.

In addition, a shape, parts (components), etc. of the charging stand and the portable game apparatus shown in this embodiment are mere examples, and may be suitably changed corresponding to actual products, etc.

For example, the concavity 120*a* and the concavity 120*b* provided on the bottom of the inserting portion of the charging stand may be integrally formed. Furthermore, if there is no push button and attaching hole for strap on the upper surface of the lower housing of the portable game apparatus, the concavities that receive the operating portion of the push button and the attaching portion for strap can be omitted. Furthermore, if there is no attaching hole for strap on the upper surface of the lower housing, or if provided the attaching portion for strap is provided on a portion other than the upper surface, the convexity provided on the rear of the inserting portion can also be omitted.

A hole (or concavity) may be provided in a part of the bottom of the inserting portion. For example, holes may be formed in portions that the concavities 120*a*-120*c* are formed.

Furthermore, since a notch should be provided at a position corresponding to the communication lamp, if providing the communication lamp at a left end when viewing the portable game apparatus from the front, the notch is formed in upper right when viewing the charging stand from the front. In addition, if not providing the communication lamp or if not making the communication lamp light during the charge, it is not necessary to provide a notch for checking the communication lamp.

Furthermore, the number of the projections formed on the bottom of the inserting portion may be one, or three or more. If providing a single projection, for example, it is thinkable that the portable game apparatus stands stably when providing the projection near the center of the inserting portion rather than when providing at a position except near the center.

Although the guide member is provided on the bottom surface of the inner side member so as to form the accommodation portion by the inner circumference surface of the outer side member, the guide member and the outer circumference surface of the housing, the guide member may not be provided. In such a case, the power cable may be wound around the housing so as not to become an obstacle of connection of the DC output plug.

In this embodiment, although it is shown that the cover constitutes a part of the housing of the portable game apparatus, the cover may protect the housing of the portable game apparatus.

Furthermore, the portable game apparatus is shown as an example of the electronic device in this embodiment, but not limited to this. It is applicable also to a charging stand for an electronic dictionary or a mobile phone that a main body is foldable or a lid can be is opened or closed, and those charging system.

Although certain example systems, devices and apparatuses have been described herein, it is to be understood that the appended claims are not to be limited to the systems, devices and apparatuses disclosed, but on the contrary, are intended to cover various modifications and equivalent arrangements included within the spirit and scope of the appended claims.

What we claimed is:

1. A charging system comprising a foldable electronic device and a charging stand that receives and charges the electronic device, wherein
   the electronic device has a cover that is detachable and covers at least a part of the electronic device other than a portion having a folding rotation axis,
   the charging stand has an inserting portion for inserting the portion having the folding rotation axis, and
   a depth of the inserting portion is set such that when inserting the electronic device into the inserting portion, a portion that is not covered with the cover is hidden by the charging stand, and all of a specific surface of the cover can be seen from a specific direction.

2. The charging system according to claim 1, wherein the charging stand hides most of the electronic device that is not covered with the cover when inserting the electronic device into the inserting portion.

3. The charging system according to claim 1, wherein the cover covers, at the specific surface, the electronic device from one end to another end in a direction perpendicular or approximately perpendicular a direction that the electronic device is inserted into the inserting portion.

4. A charging system according to claim 1, wherein the cover covers so as to surround the electronic device in a direction perpendicular or approximately perpendicular a direction that the electronic device is inserted into the inserting portion.

5. A charging system according to claim 1, wherein the depth of the inserting portion is set such that the charging stand does not hide the cover at a side of the specific direction when inserting the electronic device into the inserting portion.

6. A charging system according to claim 1, wherein the electronic device is inserted into the inserting portion in a standing state and held in that state.

7. A charging system according to claim 1, wherein the depth of the inserting portion is set such that a lower end of the cover is substantially level with an upper end of the charging stand when viewing from the specific direction when the electronic device is inserted into the inserting portion.

8. A charging system according to claim 1, wherein the cover and the charging stand are respectively formed with shapes, or applied with patterns or colors such that a unified design can be viewed as a whole when the electronic device is inserted into the inserting portion.

9. A charging system according to claim 1, the charging stand further comprising a notch at a position corresponding to a light-emitting portion of the electronic device on a side of the inserting portion when the electronic device is inserted into the inserting portion.

10. A charging system according to claim 1, the charging stand further comprising a first concavity on a bottom of the inserting portion at a position corresponding to a strap attaching portion where a strap is attached to the electronic device, wherein the first concavity is configured to receive at least the strap attaching portion.

11. A charging system according to claim 1, the charging stand further comprising a second concavity on a bottom of the inserting portion at a position corresponding to a position of a push button on the electronic device, wherein the second concavity is configured to receive at least an operating portion of the push button.

12. A charging system according to claim 1, the charging stand further comprising a convexity that projects from a side of the inserting portion toward an inside of the inserting portion so as to form a space between the electronic device and the side when the electronic device is inserted into the inserting portion.

13. A charging system according to claim 1, the charging stand further comprising a first projection on a bottom of the inserting portion that projects from the bottom in a vertical direction, the first projection being configured to be inserted into a first gap between a folding rotation axis of the electronic device and a first housing of the electronic device when the electronic device is inserted into the inserting portion.

14. A charging system according to claim 1, wherein the depth of the inserting portion is gradually changed in a short direction.

15. A charging system according to claim 1, the charging stand further comprising an accommodation portion configured to accommodate a power cable at an undersurface of the inserting portion.

16. A charging system according to claim 15, the charging stand further comprising
   an outer side member that covers an outer side of the inserting portion;
   a connecting portion that at a side of the undersurface and connects the power cable; and
   a second housing that accommodates at least a part of the connecting portion, wherein
   the accommodation portion includes a second gap between an inner circumference surface of the outer side member and an outer circumference surface of the second housing.

17. A charging system according to claim 16, wherein a connection plug of the power cable that is configured to be inserted into the connecting portion is in a space at the side of the undersurface, the charging system further comprising
a communicating portion that is on the outer side member and configured to pass the power cable.

18. A charging system according to claim 17, the charging stand further comprising a second projection near a position corresponding to the position where the communicating portion is on an outer circumference surface of the second housing.

19. A charging stand for charging an electronic device, comprising:
an inserting portion that is configured to have the electronic device inserted therein;
a notch at a position corresponding to a light-emitting portion of the electronic device on a part of a side of the inserting portion; and
a concavity on a bottom of the inserting portion at a position corresponding to a position of a push button on the electronic device, wherein the concavity is configured to receive at least an operating portion of the push button when the electronic device is inserted in the inserting portion.

* * * * *